United States Patent
Koizumi et al.

(10) Patent No.: US 11,792,527 B2
(45) Date of Patent: Oct. 17, 2023

(54) SENSOR SYSTEM, IMAGE PROCESSING APPARATUS, IMAGE PROCESSING METHOD, AND PROGRAM

(71) Applicant: Sony Interactive Entertainment Inc., Tokyo (JP)

(72) Inventors: Makoto Koizumi, Tokyo (JP); Jun Horie, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/635,553

(22) PCT Filed: Aug. 28, 2019

(86) PCT No.: PCT/JP2019/033707
§ 371 (c)(1),
(2) Date: Feb. 15, 2022

(87) PCT Pub. No.: WO2021/038750
PCT Pub. Date: Mar. 4, 2021

(65) Prior Publication Data
US 2022/0337732 A1 Oct. 20, 2022

(51) Int. Cl.
*H04N 23/71* (2023.01)
*H04N 23/74* (2023.01)
*H04N 25/47* (2023.01)
*H04N 25/707* (2023.01)

(52) U.S. Cl.
CPC ............. *H04N 23/71* (2023.01); *H04N 23/74* (2023.01); *H04N 25/47* (2023.01); *H04N 25/707* (2023.01)

(58) Field of Classification Search
CPC ........ H04N 23/56; H04N 23/71; H04N 23/74; H04N 25/47; H04N 25/707
USPC .......................................................... 348/294
See application file for complete search history.

(56) References Cited

U.S. PATENT DOCUMENTS

| 2020/0128205 A1 | 4/2020 | Sakakibara |
| 2020/0351455 A1 | 11/2020 | Niwa |
| 2021/0243347 A1* | 8/2021 | Movshovich .......... H04N 23/60 |

FOREIGN PATENT DOCUMENTS

| JP | 2018186478 A | 11/2018 |
| JP | 2019134271 A | 8/2019 |
| WO | 2019135411 A1 | 7/2019 |

OTHER PUBLICATIONS

International Search Report for corresponding PCT Application No. PCT/JP2019/033707, 2 pages, dated Nov. 12, 2019.

(Continued)

*Primary Examiner* — Anthony J Daniels
(74) *Attorney, Agent, or Firm* — Matthew B. Dernier, Esq.

(57) ABSTRACT

A sensor system includes a light source that applies, to an imaging target, light whose light amount gradually increases or gradually degreases, an event-driven type sensor that generates an event signal by detecting a fluctuation of reflection light from the imaging target after the application of the light whose light amount gradually increases or gradually degreases is started, and a gradation calculation unit that calculates a gradation of the imaging target on the basis of an elapsed period of time from the start of the application of the light whose light amount gradually increases or gradually decreases to the generation of the event signal.

4 Claims, 5 Drawing Sheets

(56) References Cited

OTHER PUBLICATIONS

Patrick Lichtsteiner, et al., "A 128×128 120dB 15μs Latency Asynchronous 2 Temporal Contrast Vision Sensor," IEEE Journal of Solid-State Circuits, vol. 43, No. 2, 12 pages, Feb. 1, 2008.

* cited by examiner

SENSOR SYSTEM, IMAGE PROCESSING APPARATUS, IMAGE PROCESSING METHOD, AND PROGRAM

TECHNICAL FIELD

The present invention relates to a sensor system, an image processing apparatus, an image processing method, and a program.

BACKGROUND ART

Image sensors such as a charge coupled device (CCD) and a complementary metal oxide semiconductor (CMOS) are solid-state imaging devices of the synchronous type that capture image data (frame) in synchronism with a synchronization signal such as a vertical synchronization signal. In a general solid-state imaging device of the synchronous type, since image data is acquired only after every cycle (for example, 1/60 second) of the synchronization signal, it is sometimes difficult to achieve compatibility with high speed processing that utilizes image data, for example, in a moving body. Therefore, a solid-state imaging device of the asynchronous type that includes an address event representation (AER) circuit that detects an address event is proposed, for example, in NPL 1 and so forth.

In the solid-state imaging device of the asynchronous type described above, an address event occurs in a case where the light amount in a pixel fluctuates at a certain pixel address and the fluctuation amount exceeds a threshold value. In particular, the address event includes an on-event that occurs in a case where the light amount in a pixel fluctuates and exceeds a predetermined upper limit and an off-event that occurs in a case where the light amount becomes less than a predetermined lower limit. In such a solid-state imaging device of the asynchronous type as just described, the format of image data that represents with data of two bits presence/absence of an on-event and an off-event for each pixel is called an AER format. A technology that uses the solid-state imaging device of the asynchronous type is also disclosed, for example, in PTL 1.

CITATION LIST

Patent Literature

[PTL 1] Japanese Patent Laid-Open No. 2018-186478

Non Patent Literature

[NPL 1] Patrick Lichtsteiner, et al., A 128×128 120 dB 15 µs Latency Asynchronous Temporal Contrast Vision Sensor, IEEE JOURNAL OF SOLID-STATE CIRCUITS, VOL. 43, NO. 2, February 2008.

SUMMARY

Technical Problem

In such a solid-state imaging device of the asynchronous type as described above (hereinafter also referred to as an event-driven type sensor), although it is possible to detect a movement of an imaging target at a high speed, since only two different kinds of information of an on-event and an off-event can be obtained as image data, it is difficult to detect a gradation of a luminance of an imaging target. For example, although it is conceivable that a solid-state imaging device of the synchronous type that can detect a gradation is arranged together with an event-driven type sensor such that, in a case where a movement of an imaging target is detected by the event-driven type sensor, the solid-state imaging device of the synchronous type is exposed to light to detect a gradation, the structure of an imaging apparatus becomes complicated.

Therefore, it is an object of the present invention to provide a sensor system, an image processing apparatus, an image processing method, and a program that make it possible to detect a gradation of an imaging target with a simple configuration using an event-driven type sensor.

Solution to Problem

According to a certain aspect of the present invention, there is provided a sensor system including a light source that applies, to an imaging target, light whose light amount gradually increases or gradually degreases, an event-driven type sensor that generates an event signal by detecting a fluctuation of reflection light from the imaging target after application of the light whose light amount gradually increases or gradually degreases is started, and a gradation calculation unit that calculates a gradation of the imaging target on the basis of an elapsed period of time from the start of the application of the light whose light amount gradually increases or gradually decreases to the generation of the event signal.

According to another aspect of the present invention, there is provided an image processing apparatus including a light source controlling unit that controls a light source that applies light to an imaging target, according to a control pattern of a time series in which a light amount gradually increases or gradually decreases, an elapsed-period-of-time specification unit that specifies an elapsed period of time after the application of the light whose light amount gradually increases or gradually degreases is started until an event-driven type sensor generates an event signal by detecting a fluctuation of each reflection light from the imaging target, and a gradation calculation unit that calculates a gradation of the imaging target on the basis of the elapsed period of time and the control pattern.

According to a further aspect of the present invention, there is provided an image processing method including a step, performed by a light source, of applying, to an imaging target, light whose light amount gradually increases or gradually degreases, a step, performed by an event-driven type sensor, of generating an event signal, the event-driven type sensor detecting a fluctuation of reflection light from the imaging target after the application of the light whose light amount gradually increases or gradually degreases is started, and a step of calculating a gradation of the imaging target on a basis of an elapsed period of time from the start of the application of the light whose light amount gradually increases or gradually decreases to the generation of the event signal.

According to a still further aspect of the present invention, there is provided a program for causing a computer to implement a function of controlling a light source that applies light to an imaging target, according to a control pattern of a time series in which a light amount gradually increases or gradually decreases, a function of specifying an elapsed period of time after the application of the light whose light amount gradually increases or gradually degreases is started until an event-driven type sensor generates an event signal by detecting a fluctuation of each reflection light from the imaging target, and a function of calculating a gradation of the imaging target on the basis of the elapsed period of time and the control pattern.

DESCRIPTION OF EMBODIMENT

In the following, a preferred embodiment of the present invention is described in detail with reference to the accompanying drawings. It is to be noted that, in the present specification and the drawings, components having substantially same functional configurations are denoted by like reference signs and overlapping description of them is omitted herein.

Figure 1:
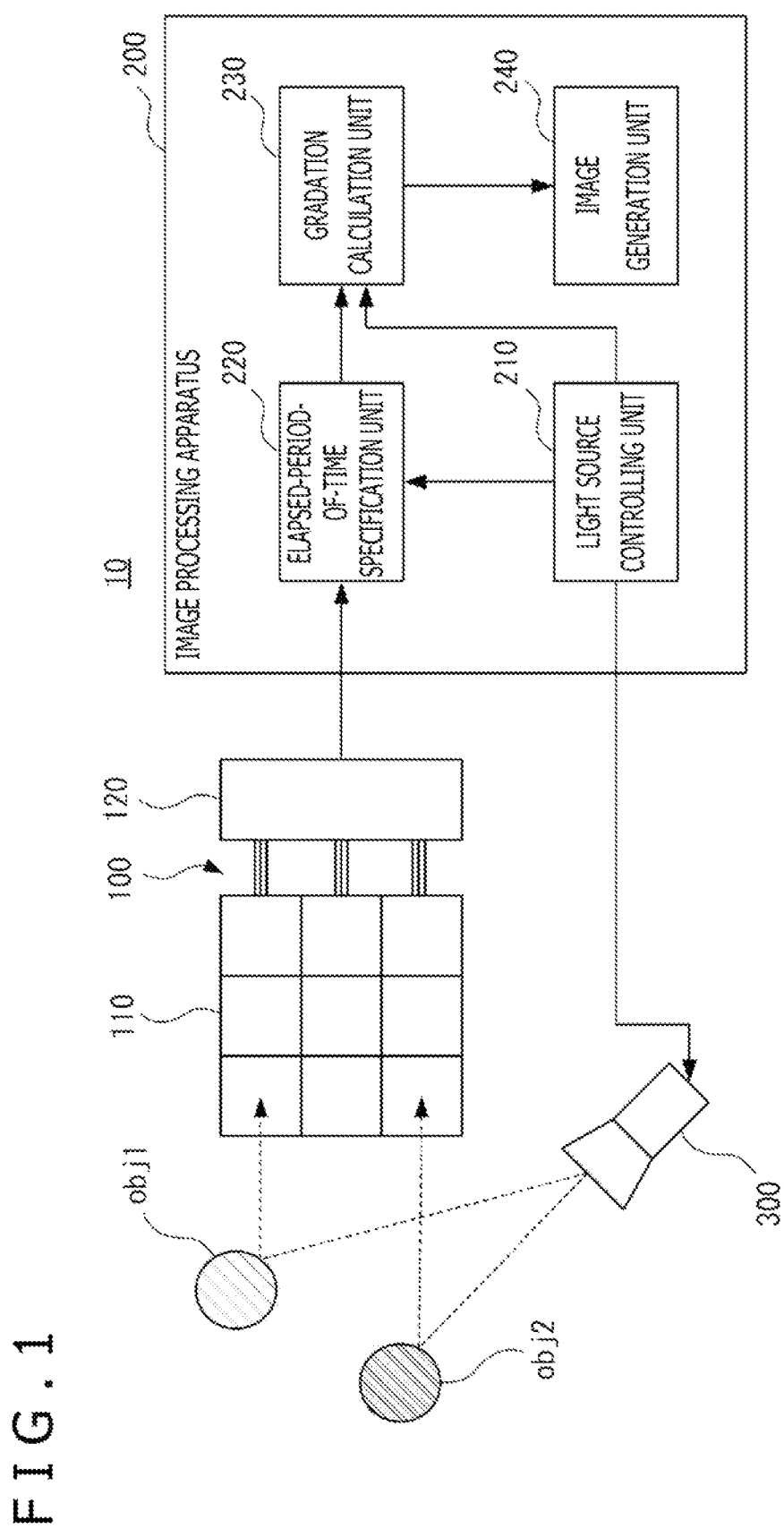
FIG. 1 is a view depicting a general configuration of a system according to an embodiment of the present invention.

FIG. 1 is a view depicting a general configuration of a system according to an embodiment of the present invention. As depicted in FIG. 1, a sensor system 10 includes a sensor module 100, an image processing apparatus 200, and a light source 300. The sensor module 100 includes a sensor array including an event-driven type sensor (EDS) 110 arranged for each pixel, and a signal processing circuit 120. The image processing apparatus 200 is implemented, for example, by a computer including a communication interface, a processor, and a memory and includes functioning portions of a light source controlling unit 210, an elapsed-period-of-time specification unit 220, and a gradation calculation unit 230 that are realized by operation of the processor according to a program stored in the memory or received through the communication interface. The image processing apparatus 200 may further include a functioning portion of an image generation unit 240. In the following, the components are described further.

In the sensor module 100, the EDS 110 outputs an event signal indicative of occurrence of an address event, when the fluctuation amount of the light amount exceeds a threshold value at each of pixel addresses. In the present embodiment, the light source 300 applies light having a gradually increasing light amount to imaging targets obj1 and obj2 as hereinafter described, and at this time, the EDS 110 detects the fluctuation of reflection light from the imaging targets obj1 and obj2, to generate an event signal. The signal processing circuit 120 includes a memory and a processor, and the processor operates according to a program stored in the memory, to process the event signal generated by the EDS 110. In particular, the signal processing circuit 120 generates a timestamp for the event signal.

In the image processing apparatus 200, the light source controlling unit 210 controls the light source 300 according to a control pattern of a time series in which the light amount gradually increases. The light source 300 may be, for example, a light source that is used as a projector and allows adjustment of the light amount thereof. The light amount of the light source 300 may be adjusted continuously (steplessly) or may be adjusted stepwise. The light applied from the light source 300 may be visible light or may be light other than visible light, such as infrared light. The light source controlling unit 210 provides, to the elapsed-period-of-time specification unit 220 and the gradation calculation unit 230, information which indicates application starting time of light whose light amount increases gradually, particularly, time at which a control signal is transmitted to the light source 300 such that, for example, application of light whose light amount increases gradually is started, and which further indicates the light amount of a time series of the light source 300 indicated by a control pattern of a time series.

The elapsed-period-of-time specification unit 220 specifies an elapsed period of time after application, from the light source 300, of light whose light amount increases gradually is started until the EDS 110 generates an event signal. In particular, the elapsed-period-of-time specification unit 220 specifies the elapsed period of time from the difference between time at which the light source controlling unit 210 transmits a control signal to the light source 300 such that application of light whose light amount gradually increases is started and the timestamp for an event signal generated by the signal processing circuit 120 of the sensor module 100. In the present embodiment, such an elapsed period of time as described above can be specified since the time information of the signal processing circuit 120 and the time information of the light source controlling unit 210 are in synchronism with each other or since the elapsed-period-of-time specification unit 220 can associate the time information of the signal processing circuit 120 and the time information of the light source controlling unit 210 with each other.

The gradation calculation unit 230 calculates a gradation of the imaging targets obj1 and obj2 on the basis of the elapsed period of time specified by the elapsed-period-of-time specification unit 220 and the control pattern for the light source 300 provided from the light source controlling unit 210. In the present embodiment, the gradation calculation unit 230 calculates the gradation of the imaging targets obj1 and obj2 by utilizing the fact that, when the light source 300 applies light whose light amount increases gradually, the timing at which the EDS 110 detects a fluctuation of reflection light to generate an event signal differs between the imaging targets obj1 and obj2 whose gradations are different from each other. This point is described hereinafter with reference to FIGS. 2 to 4.

The image generation unit 240 generates an image of an imaging target on the basis of the event signal with use of the gradation of the imaging target calculated by the gradation calculation unit 230. In another example, together with the image generation unit 240 or in place of the image generation unit 240, a functioning portion which selects a process for the imaging target recognized from the event signal, according to the gradation of the imaging target may be provided. The functioning portion that executes the process using the gradation of an imaging target may be implemented in the inside of the image processing apparatus 200 or may be implemented in an external apparatus that receives the information indicative of the gradation of the imaging target from the image processing apparatus 200.

Figure 2:
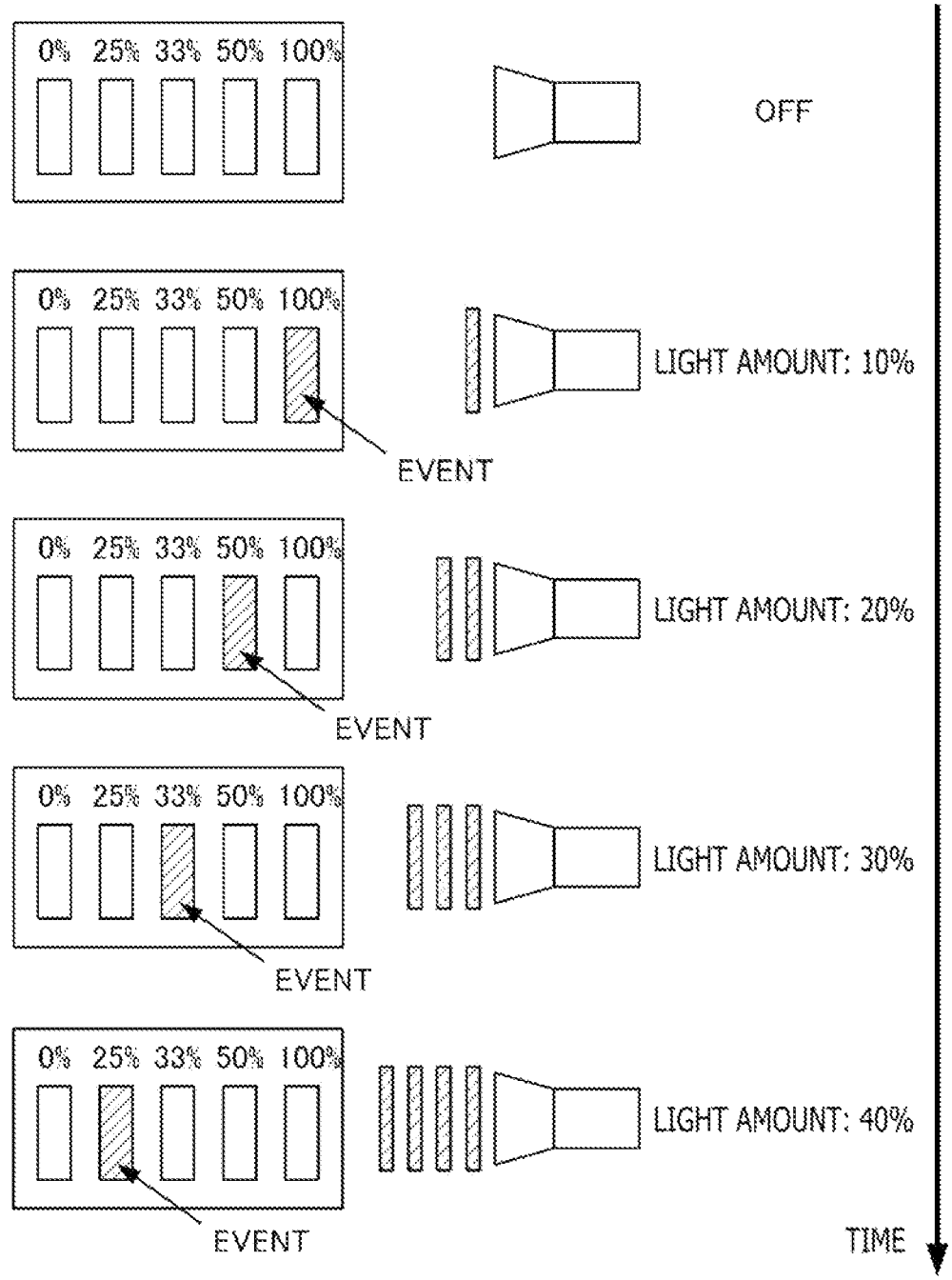
FIG. 2 is a view for describing a principle of gradation calculation of an imaging target in the embodiment of the present invention.

FIG. 2 is a view for describing a principle of gradation calculation of an imaging target in the embodiment of the present invention. In the example depicted, while the light amount of light applied from the light source gradually increases from 0% (OFF) to 40% in a time series, an event occurs at portions of the imaging target at which the reflection factor differs due to the difference in gradation (portions at which the reflection factor is 100%, 50%, 33%, 25%, and 0%). For example, at the point of time at which the amount of light applied from the light source reaches 10%, an event occurs at the portion at which the reflection factor is 100%. This is because, at a portion at which the reflection factor is high, a change in contrast sufficient to cause an event is obtained even with a small light amount. On the other hand, at this point of time, at any portion at which the reflection factor is equal to or lower than 50%, an event does not occur.

Thereafter, when the light amount increases and reaches 20%, an event occurs at a portion at which the reflection factor is 50%. In the example depicted, although an event does not occur at any portion at which the light amount of the light source at this time exceeds a threshold value for a reflection factor with which an event occurs (a portion at which the reflection factor is 100%), an event occurs in a case where an event is caused by flicker of the light source. On the other hand, at this point of time, an event does not occur at any portion at which the reflection factor is equal to or lower than 33%. When the light amount further increases and reaches 30%, an event occurs at a position at which the reflection factor is 33%. Also in this case, similarly, although there is a possibility that an event may occur at respective portions at which the reflection factors are 50% and 100%, an event does not occur at any portion at which the reflection factor is equal to or lower than 25%. Similarly, when the light amount increases and reaches 40%, an event occurs at a portion at which the reflection factor is 25%.

Figure 3:
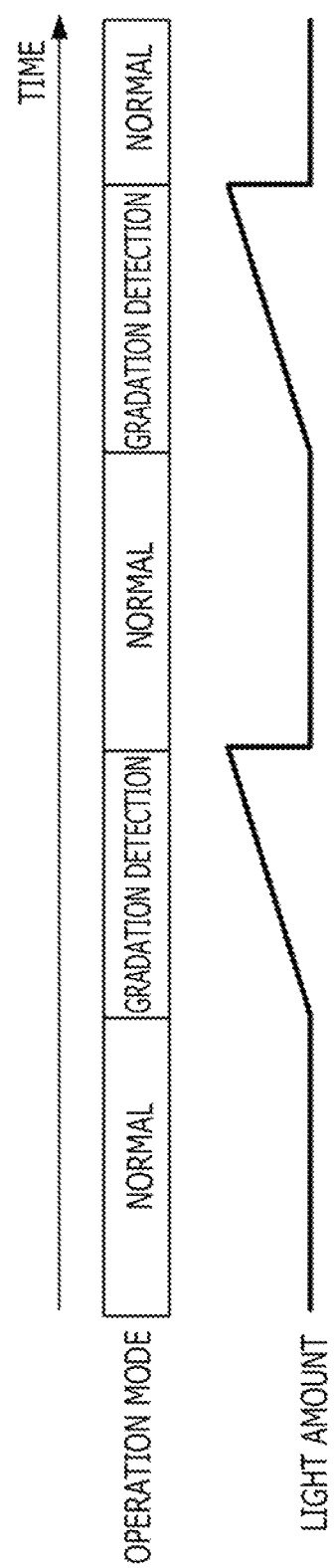
FIG. 3 is a view depicting an example of a control pattern for a light source, the control pattern being based on the principle depicted in FIG. 2.

FIG. 3 is a view depicting an example of a control pattern for the light source, the control pattern being based on the principle depicted in FIG. 2. In the example depicted, the light source controlling unit 210 of the image processing apparatus 200 controls the light source 300 such that, as an operation mode, a normal mode and a gradation detection mode are repeated alternately. The normal mode is a mode in which the light source 300 applies light of a fixed light amount, and the gradation detection mode is a mode in which the light source 300 applies light whose light amount increases gradually. In this case, the light source controlling unit 210 provides information indicative of start time of the gradation detection mode in each operation cycle to the elapsed-period-of-time specification unit 220 and provides information indicative of an increase rate of the light amount in the gradation detection mode to the gradation calculation unit 230. The gradation calculation unit 230 calculates a gradation of an imaging target with use of the event signal generated by the EDS 110 in the gradation detection mode, that is, during application of light whose light amount gradually increases. In another example, the light source controlling unit 210 may control the light source 300 such that only the gradation detection mode is repeated.

Figure 4:
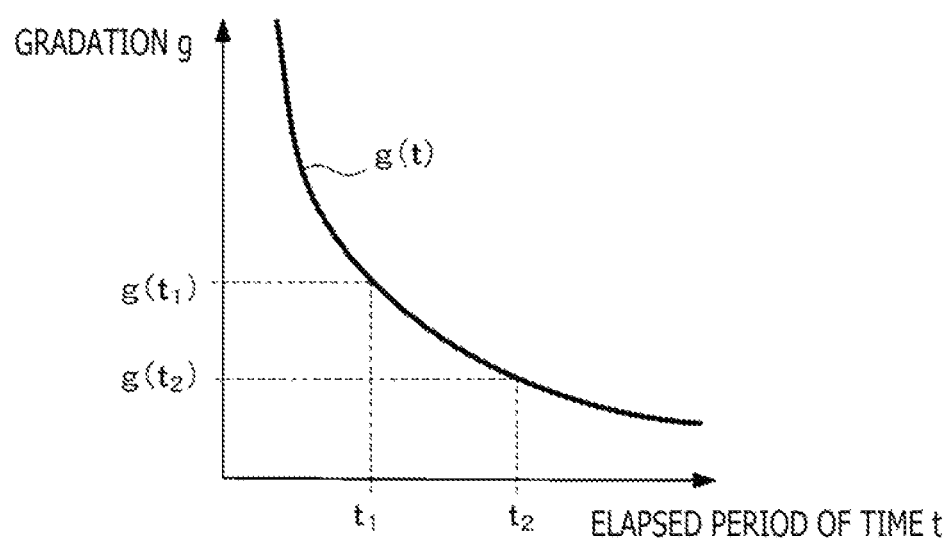
FIG. 4 is a view depicting an example of a function for calculating a gradation of an imaging target on the basis of the control pattern for a light source.

FIG. 4 is a view depicting an example of a function for calculating a gradation of an imaging target on the basis of a control pattern of a light source. As described hereinabove with reference to FIG. 2, a gradation corresponding to such a control pattern for a light source as described hereinabove with reference to FIG. 3 is specified in a time series by measuring in advance such a relation between the light source and the gradation (reflection factor) of an imaging target with which an event occurs as described hereinabove with reference to FIG. 2. Then, a function g(t) between an elapsed period of time t and a gradation g as depicted in FIG. 4 is obtained. The function g(t) indicates that, in a case where the elapsed period of time is $t_1$, the gradation of the imaging target is $g(t_1)$ and, in a case where the elapsed period of time is $t_2$ ($t_1 < t_2$), the gradation of the imaging target is $g(t_2)$ ($g(t_1) > g(t_2)$).

Figure 5:
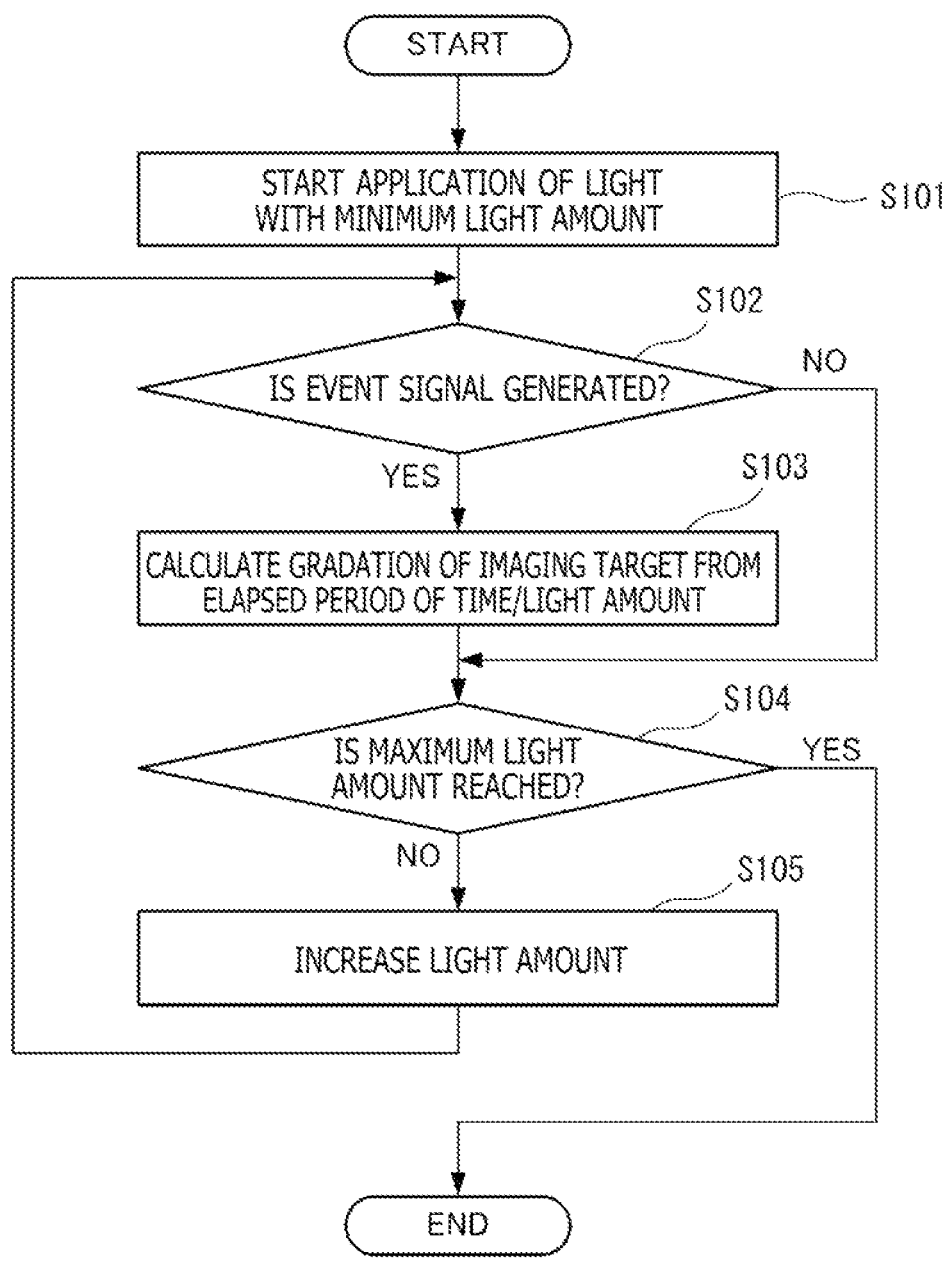
FIG. 5 is a flow chart depicting an example of processing in the embodiment of the present invention.

FIG. 5 is a flow chart depicting an example of processing in the embodiment of the present invention. In the example depicted, the light source 300 first starts application of light with a minimum light amount under the control of the light source controlling unit 210 of the image processing apparatus 200 (step S101). Here, the minimum light amount is a first light amount when the light source 300 increases the light amount gradually and corresponds to a light amount when, in the gradation detection mode, the light amount begins to increase from the light amount in the normal mode, in the example depicted in FIG. 3. The time at which the application of light is started is used as a reference for an elapsed period of time in processing in the following steps.

Here, in a case where an event signal is generated by the EDS 110 (step S102), the elapsed-period-of-time specification unit 220 specifies an elapsed period of time from the start of gradual increase of the light amount (step S101) to the generation of an event signal, and the gradation calculation unit 230 calculates the gradation of the imaging target from the elapsed period of time and the light amount at the time indicated by the control pattern of the gradation calculation unit 230 (step S103). While the light source controlling unit 210 causes the light amount to increase until the light amount reaches a maximum light amount (steps S104 and S105), if some imaging target from which an event signal is generated by the EDS 110 exists, then the processes for calculating the light amount of the imaging target (steps S102 and S103) are repeated on the basis of the elapsed period of time and the light amount at the time.

In the first embodiment of the present invention described above, light whose light amount gradually increases is applied to an imaging target by control of the light source, and the gradation of the imaging target corresponding to the light amount when an event occurs based on reflection light from the imaging target is calculated on the basis of the elapsed period of time from the start of the application of light. Consequently, the gradation of the imaging target can be detected with a simple configuration using an EDS.

It is to be noted that, although, in the example described above, the light source applies, to an imaging target, light whose light amount gradually increases, in another example, the light source may otherwise applies, to an imaging target, light whose light amount gradually decreases. Although, in the case where the light amount gradually increases, the EDS generates an event signal indicative of an on-event, to detect the gradation of an imaging target, in the case where the light amount gradually decreases, the EDS generates an event signal indicative of an off-event, to detect the gradation of an imaging target.

Although the preferred embodiment of the present invention has been described in detail with reference to the accompanying drawings, the present invention is not limited to such an embodiment as described above. It is apparent that persons who have normal knowledge in the technical field to which the present invention pertains can conceive various alterations or modifications within the scope of the technical idea described in the claims, and it is construed that they also naturally fall within the technical scope of the present invention.

REFERENCE SIGNS LIST

10: Sensor system
100: Sensor module

120: Signal processing circuit
200: Image processing apparatus
210: Light source controlling unit
220: Elapsed-period-of-time specification unit
230: Gradation calculation unit
240: Image generation unit
300: Light source.

The invention claimed is:

1. A sensor system comprising:
a light source that applies, to an imaging target, light whose light amount gradually increases or gradually decreases;
an event-driven type sensor that generates an event signal by detecting a fluctuation of reflection light from the imaging target after application of the light whose light amount gradually increases or gradually decreases is started; and
a gradation calculation unit that calculates a gradation of the imaging target on a basis of an elapsed period of time from the start of the application of the light whose light amount gradually increases or gradually decreases to the generation of the event signal, wherein:
the light source alternately applies the light whose light amount gradually increases or gradually decreases and light whose light amount is fixed, and
the gradation calculation unit calculates the gradation with use of the event signal generated by the event-driven type sensor during the application of the light whose light amount gradually increases or gradually decreases.

2. An image processing apparatus comprising:
a light source controlling unit that controls a light source that applies light to an imaging target, according to a control pattern of a time series in which a light amount gradually increases or gradually decreases;
an elapsed-period-of-time specification unit that specifies an elapsed period of time after the application of the light whose light amount gradually increases or gradually decreases is started until an event-driven type sensor generates an event signal by detecting a fluctuation of each reflection light from the imaging target; and
a gradation calculation unit that calculates a gradation of the imaging target on a basis of the elapsed period of time and the control pattern, wherein:
the light source alternately applies the light whose light amount gradually increases or gradually decreases and light whose light amount is fixed, and
the gradation calculation unit calculates the gradation with use of the event signal generated by the event-driven type sensor during the application of the light whose light amount gradually increases or gradually decreases.

3. An image processing method comprising:
by a light source, applying, to an imaging target, light whose light amount gradually increases or gradually decreases;
by an event-driven type sensor, generating an event signal, the event-driven type sensor detecting a fluctuation of reflection light from the imaging target after the application of the light whose light amount gradually increases or gradually decreases is started; and
calculating a gradation of the imaging target on a basis of an elapsed period of time from the start of the application of the light whose light amount gradually increases or gradually decreases to the generation of the event signal, wherein:
the light source alternately applies the light whose light amount gradually increases or gradually decreases and light whose light amount is fixed, and
the calculating includes calculating the gradation with use of the event signal generated by the event-driven type sensor during the application of the light whose light amount gradually increases or gradually decreases.

4. A non-transitory, computer readable storage medium containing a program, which when executed by a computer, causes the computer to perform an image processing method by carrying out actions, comprising:
controlling a light source that applies light to an imaging target, according to a control pattern of a time series in which a light amount gradually increases or gradually decreases;
specifying an elapsed period of time after the application of the light whose light amount gradually increases or gradually decreases is started until an event-driven type sensor generates an event signal by detecting a fluctuation of each reflection light from the imaging target; and
calculating a gradation of the imaging target on a basis of the elapsed period of time and the control pattern, wherein:
the light source alternately applies the light whose light amount gradually increases or gradually decreases and light whose light amount is fixed, and
the calculating includes calculating the gradation with use of the event signal generated by the event-driven type sensor during the application of the light whose light amount gradually increases or gradually decreases.

* * * * *